UNITED STATES PATENT OFFICE.

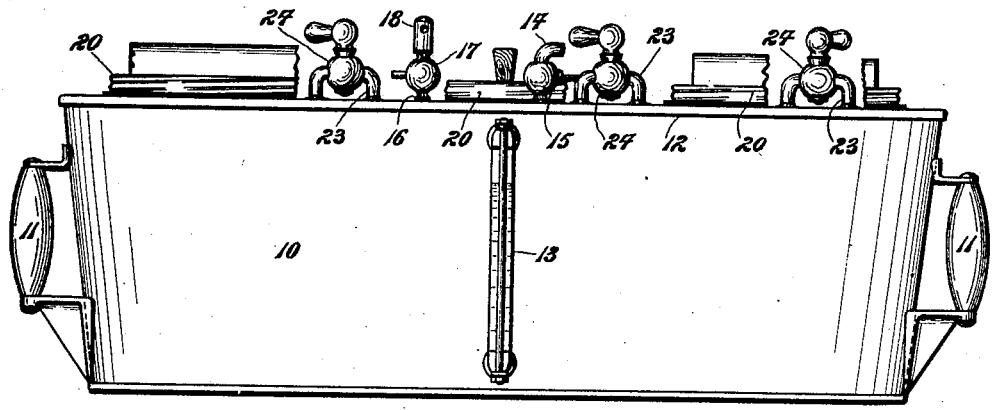
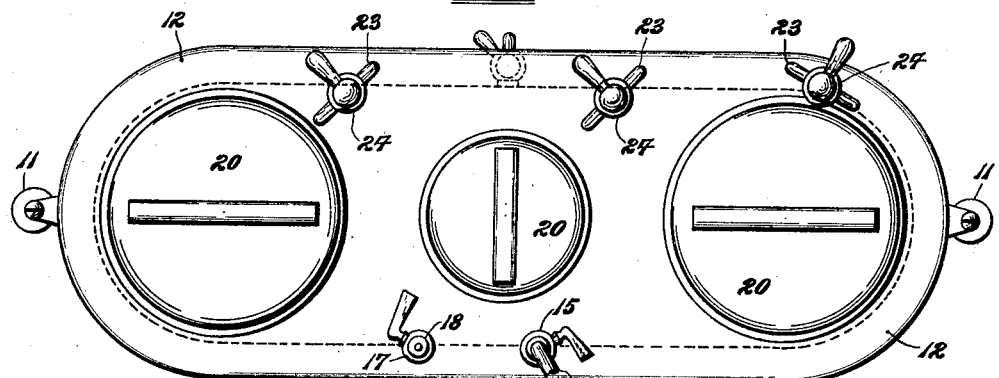
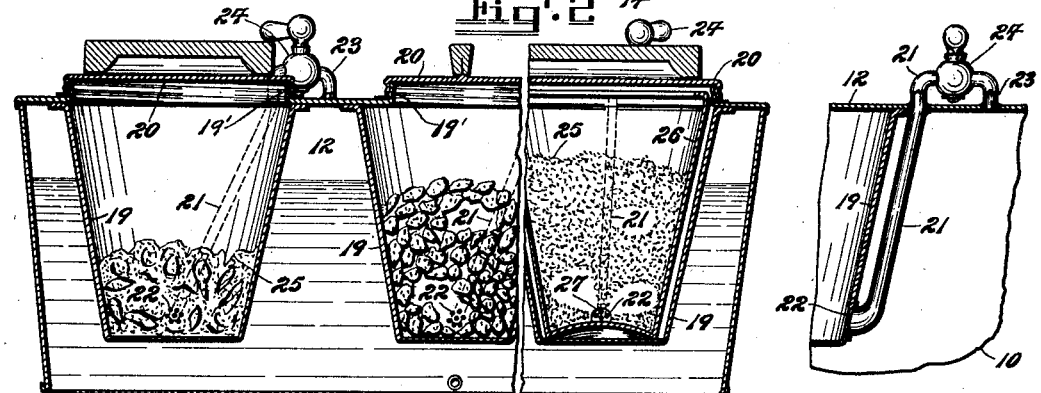

USHIR KOLCHINSKY, OF PHILADELPHIA, PENNSYLVANIA.

STEAM-COOKER.

1,393,546.  Specification of Letters Patent.  Patented Oct. 11, 1921.

Application filed September 11, 1920. Serial No. 409,598.

*To all whom it may concern:*

Be it known that I, USHIR KOLCHINSKY, a citizen of the United States, residing at Philadelphia, in the county of Philadelphia and State of Pennsylvania, have invented new and useful Improvements in Steam-Cookers, of which the following is a specification.

The invention relates to cooking utensils and devices, and has for an object to provide cooking utensils for cooking various foods.

The invention comprehends among other features a cooker which might be more definitely termed a steam cooker in that a quantity of water is subjected to heat and brought to a boiling point to generate steam which is then independently conveyed to various receptacles and injected therein to come into direct contact with the contents of the receptacles to cook the food contained therein.

Among other features the invention comprehends a steam cooker in which the generated steam will be of a substantially dry nature so as to exclude as much as possible the direct moisture or water and to this end various control means are provided for controlling the amount and supply of steam to the receptacle containing the food.

In the further disclosure of the invention reference is to be had to the accompanying drawings, constituting a part of this specification, in which similar characters of reference denote corresponding parts in all the views, and in which,—

Figure 1—is an elevation of the cooker;

Fig. 2—is a plan view;

Fig. 3—is a vertical longitudinal sectional view taken through the cooker, and

Fig. 4—is a vertical sectional view taken through one of the connections from the boiler to one of the food containing receptacles.

Referring more particularly to the drawings a boiler 10, provided with suitable handles 11, is adapted to contain water which, when the boiler is placed over a flame, will be suitably heated and brought to the boiling point to generate steam. The boiler is substantially a closed receptacle, including a top 12 and applied to the exterior of the boiler and communicating therewith is a suitable water gage 13 for determining the height of the water in the boiler. The water is suitably conveyed to the boiler through an inlet 14 equipped with a suitable cock 15 and the boiler is also provided with a steam outlet 16 controlled by a cock 17, which outlet 16 may be provided with a suitable alarm such as a steam whistle 18, so that when the water reaches the boiling point, the steam escaping through the outlet 16 will actuate the whistle 18 and indicate to the user that the boiler is in proper condition for cooking food.

Depending from the top 12 to extend into the boiler 10 are food receptacles 19, the upper open ends of which communicate with openings formed by upwardly extending annular threaded flanges 19' of the top 12, adapted to receive suitable handled covers 20 which are preferably suitably threaded on to the flanges 19' to close and effectively seal the food receptacles. Each receptacle has connected thereto near its lower end a steam pipe 21 which at its outlet into the receptacle is arranged so the steam will pass through a perforated portion 22 of the receptacle formed by perforating the wall thereof at the point where the steam pipe connects with the receptacle. The steam pipe 21 projects through the top 12 and extending downwardly within the boiler 10, is connected at its lower end with the food receptacle 19 adjacent the bottom thereof, as previously described. Exteriorly of the top 12 the pipe 21 is connected with a pipe 23 by a valve or cock 24. The pipe 23 communicates with the interior of the boiler 10, and when the valve 24 is open, steam from the boiler 10 passes through the pipe 23, valve 24, and pipe 21 into the food receptacle 19. The cock 24 may be shut off to prevent the admission of steam into the food receptacle, partially opened for the admission of a certain amount of the steam to the receptacle or entirely opened to permit a full blast of the steam to be received in the receptacle. Now by arranging a quantity of food 25 in the receptacle 19, it will be apparent that when steam is generated in the boiler and the operator has been notified thereof, that it is only necessary to partially or entirely open the stop-cock 24 and thus permit the steam to enter the cooking receptacle to cook the food therein. I may desire to provide an auxiliary food receptacle 26 which is removably disposed in the receptacle 19 and which has an opening 27 to register with the perforated portion 22, the food being contained in the auxiliary receptacle and the latter dropped into the main receptacle 19. This latter construction provides that the auxiliary receptacle can be conveniently removed to receive the food and removed later when the food is cooked, although it will of course be apparent that the auxiliary receptacle might be dispensed with and the food disposed direct in the receptacle 19 and later on removed therefrom by a soup spoon or ladle (not shown).

By having the steam pipes arranged to pass through the boiler before they communicate with the food receptacles, the steam generated in the boiler and passing through the pipes 23 and cocks 24 and thence into the steam pipes 21, will be substantially heated before it enters the receptacles so that a dry steam will be obtained to operate upon and cook the food contained in the receptacles, and it will of course be apparent that various slight changes may be made from the construction set out without departing from the spirit of the invention, the scope of which is to be found in the appended claims.

Having described my invention, what I claim is—

1. A steam cooker comprising a boiler, a top closing the boiler, a food receptacle depending from the top within said boiler, a steam pipe carried by the top, one end of said pipe communicating with the boiler and the other end extending from the exterior of the top downwardly within the boiler and communicating with the food receptacle adjacent the bottom thereof, and a controlling cock for said steam pipe disposed exteriorly of the boiler.

2. A steam cooker comprising a boiler, a top closing the boiler, said top being provided with a water inlet and a steam outlet, a food receptacle depending from the top within said boiler, a cover associated with the receptacle and said top, a controlling cock for said steam outlet, a steam pipe within the boiler and projecting through said top for establishing interior communication between the boiler and the food receptacle, and a controlling cock for said steam pipe disposed exteriorly of the boiler.

3. A steam cooker comprising a boiler constituting a source of steam supply, a top for said boiler, a plurality of food receptacles depending from said top within the boiler, a plurality of steam pipes within the boiler and projecting through said top for establishing interior communication between the food receptacles and said source of steam supply, and controlling cocks for said steam pipes disposed exteriorly of the boiler whereby one or more of said receptacles may be disconnected from said source of steam supply.

4. A steam cooker comprising a boiler constituting a source of steam supply, a top for said boiler, a plurality of food receptacles depending from said top within the boiler, a plurality of covers associated with the receptacles and said top, a plurality of steam pipes within the boiler and projecting through said top for establishing interior communication between the food receptacles and said source of steam supply, and controlling cocks for said steam pipes disposed exteriorly of the boiler whereby one or more of said receptacles may be disconnected from said source of steam supply as desired.

In testimony whereof I affix my signature.

USHIR KOLCHINSKY.